United States Patent
Padala et al.

(10) Patent No.: US 11,755,482 B2
(45) Date of Patent: Sep. 12, 2023

(54) NETWORK ENTITIES AND METHODS PERFORMED THEREIN FOR HANDLING CACHE COHERENCY

(71) Applicant: Telefonaktiebolaget LM Ericsson (publ), Stockholm (SE)

(72) Inventors: Chakri Padala, Bangalore (IN); Amir Roozbeh, Stockholm (SE); Ahsan Javed Awan, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/596,743

(22) PCT Filed: Jun. 20, 2019

(86) PCT No.: PCT/SE2019/050601
§ 371 (c)(1),
(2) Date: Dec. 17, 2021

(87) PCT Pub. No.: WO2020/256610
PCT Pub. Date: Dec. 24, 2020

(65) Prior Publication Data
US 2022/0342822 A1   Oct. 27, 2022

(51) Int. Cl.
*G06F 12/00* (2006.01)
*G06F 12/0817* (2016.01)
*G06F 12/1045* (2016.01)

(52) U.S. Cl.
CPC ...... *G06F 12/0828* (2013.01); *G06F 12/1063* (2013.01); *G06F 2212/621* (2013.01); *G06F 2212/65* (2013.01)

(58) Field of Classification Search
CPC ............ G06F 12/0828; G06F 12/1063; G06F 2212/621; G06F 2212/65
See application file for complete search history.

(56) References Cited

U.S. PATENT DOCUMENTS 6,981,101 B1   12/2005   Miller et al.
2009/0019232 A1   1/2009   Deshpande et al.
(Continued)

FOREIGN PATENT DOCUMENTS

WO   2016133683 A1   8/2016

OTHER PUBLICATIONS

International Search Report and Written Opinion for Application No. PCT/SE2019/050601, dated Mar. 13, 2020, 16 pages.
(Continued)

*Primary Examiner* — Gurtej Bansal
(74) *Attorney, Agent, or Firm* — Nicholson De Vos Webster & Elliott LLP

(57) ABSTRACT

A method performed by a coordinating entity in a disaggregated data center architecture wherein computing resources are separated in discrete resource pools and associated together to represent a functional server. The coordinating entity obtains a setup of processor cores that are coupled logically as the functional server, and determines an index indicating an identity of a cache coherency domain based on the obtained setup of processor cores. The coordinating entity further configures one or more communicating entities associated with the obtained setup of processor cores, to use the determined index when handling updated cache related data.

12 Claims, 12 Drawing Sheets

(56) References Cited

U.S. PATENT DOCUMENTS

2013/0297914 A1* 11/2013 Ekanadham ........ G06F 9/30007
712/220
2015/0095008 A1 4/2015 Wang et al.

OTHER PUBLICATIONS

Invitation to Pay Additional Fees for Application No. PCT/SE2019/050601, dated Feb. 26, 2020, 8 pages.
Communication pursuant to Article 94(3) EPC for EP Application No. 19734936.8, dated Feb. 9, 2023, 5 pages.
Communication under Rule 71(3) EPC for EP Application No. 19734936.8, dated Jul. 17, 2023, 8 pages.

* cited by examiner

NETWORK ENTITIES AND METHODS PERFORMED THEREIN FOR HANDLING CACHE COHERENCY

CROSS-REFERENCE TO RELATED APPLICATIONS

This application is a National stage of International Application No. PCT/SE2019/050601, filed Jun. 20, 2019, which is hereby incorporated by reference.

TECHNICAL FIELD

Embodiments herein relate to network entities and methods performed therein. In particular, embodiments herein relate to handling cache coherency in a communication network.

BACKGROUND

To greatly simplify, a computer system comprises processing units, such as central processing units (CPUs), connected to a main memory. The CPU fetches different instructions and data from the main memory, which is expensive regarding delay due to high access latency of slow main memory. Using on-chip caches is one of the prevalent techniques to hide main memory latency by exploiting a temporal and spatial locality of memory accesses to these on-chip caches. However, these caches cannot be built simultaneously fast enough to match the speed of processing of a CPU, and/or large enough to mask latency of the main memory. A three-level cache hierarchy is a popular solution used by modern processors where smaller and faster layer one (L1) and layer two (L2) cache are kept private to each processor core and a larger last level cache (LLC) is shared among all processor cores.

Herein CPU is used to refer to a processing unit or a set of processing units such as a collection of processor cores on the same socket/die with its on-chip caches.

In the current multi-socket systems, processor cores, also referred to as core(s), of one socket, can access memory attached to another socket. In some processors, an interconnect protocol called as quick path interconnect (QPI)/ultra-path interconnect (UPI), based on the CPU generation, running on top of a highspeed inter-CPU link enables this. The CPU may read/write from/to memory a single cache line at a time, although this is called byte addressable. A cache line is the unit of data transfer between the cache and main memory. The cache line size depends on the CPU generation and architecture. 64 bytes is a popular cache line size in current generation systems but other cache line sizes (32,128) are also in use. CPU may read/write memory in a cache-aligned fashion, e.g., on a 64-byte cache line system, the reads/writes will happen at memory addresses 64,128, 192, 256 (these addresses are for illustration—systems have reserved addresses/valid address ranges etc.)

Different processor cores from the sockets, even multiple cores in single processor systems, may access the same cache line of memory. Since each processor core may have private caches, e.g. L1, L2 as mentioned above, the requirement to keep these caches in sync so that they are not working on invalid data, exists. Protocols are required to keep the data in sync between processor cores, i.e. the caches are updated correctly. Such protocols are called cache coherency protocols. There are a variety of protocols, but primarily two classes of protocols summarized succinctly here.

Snoop based: Where each cache or processor core, monitors topologies such as busses, mesh and/or torus, for changes in the data they hold.

Directory based: A centralized system keeps track of changes and each processor core requests permission from the directory for making changes.

Typically, in a hardware-based system, a snooping-based cache coherency protocol is implemented, i.e., sometimes with the assistance of a directory-based system.

In today's multi CPU system, each CPU has its own random access memory (RAM), although this can be accessed from other CPUs in the system connected by e.g. QPI/UPI based interconnect. However, the latency for accessing the memory of one CPU from another CPU is higher than accessing a local memory. This is referred to as Non-Uniform Memory Access (NUMA), see FIG. 1. NUMA aware software processing systems try to limit the use of RAM from other systems.

Existing cache coherency solutions tend to be chatty broadcasting a lot of data across processor cores and across sockets. As a single operating system manages the whole system, process and kernel data structures may be spread across processor cores. Cache coherency messages are sent to all the processor cores.

One of the problems with running applications across multiple CPU sockets is dealing with NUMA. Over the last couple of years, big data applications and Virtual Network Functions (VNFs) which required a lot of processing have learned to deal with NUMA, using local data and minimal communications. However, they are still affected by cache coherency penalties and not able to scale beyond few CPU sockets. With the explosion of data and data being spread around, the ability to run a single logical server, comprising processing units and memory across many boards of one or more data centers, using local data and some minimal state sharing across processor cores could present many new opportunities. Reducing resource stranding being a first order possibility. It will also bring the vision of "data center (DC) as a single computer" closer.

SUMMARY

An object of embodiments herein is to provide a mechanism that enable usage of a disaggregated data center architecture in an efficient manner.

According to an aspect the object may be achieved by providing a method performed by a coordinating entity in a disaggregated data center architecture wherein computing resources are separated in discrete resource pools and associated together to represent a functional server. The coordinating entity obtains a setup of processor cores that are coupled logically as the functional server, and determines an index indicating an identity of a cache coherency domain based on the obtained setup of processor cores. The coordinating entity further configures one or more communicating entities associated with related to the obtained setup of processor cores, to use the determined index when handling updated cache related data such as cache lines.

According to another aspect the object may be achieved by providing a method performed by a communicating entity in a disaggregated data center architecture wherein computing resources are separated in discrete resource pools and associated together to represent a functional server. The communicating entity handles received updated cache related data using an index, wherein the index indicates an identity of a cache coherency domain.

According to yet another aspect the object may be achieved by providing a coordinating entity for a disaggregated data center architecture wherein computing resources are separated in discrete resource pools and associated together to represent a functional server. The coordinating entity is configured to obtain a setup of processor cores that are coupled logically as the functional server, and to determine an index indicating an identity of a cache coherency domain based on the obtained setup of processor cores. The coordinating entity is further configured to configure one or more communicating entities associated with related to the obtained setup of processor cores, to use the determined index when handling updated cache related data.

According to still another aspect the object may be achieved by providing a communicating entity for a disaggregated data center architecture wherein computing resources are separated in discrete resource pools and associated together to represent a functional server. The communicating entity is configured to handle received updated cache related data using an index, wherein the index indicates an identity of a cache coherency domain.

The embodiments herein provide entities and methods to reduce cache coherency traffic across a multi-core functional server in a disaggregated data center. Embodiments herein specify the communicating entity, such as a gateway (GVV), that is configured to direct and filter cache coherency traffic based on the index. Embodiments herein may group logical processor cores across the disaggregated data center into a single cache coherency domain and may configure or program the communicating entity for optimized messaging of cache coherency messages. Embodiments herein limit communication of cache coherency messages and efficiently propagate the cache coherency messages across e.g. multiple racks in the disaggregated data center. Embodiments herein may thus use resources in a more efficient manner e.g. reduce resource stranding which resource stranding means that you have leftover processor capacity in one place and leftover memory in another place.

BRIEF DESCRIPTION OF THE DRAWINGS

The embodiments herein will now be described and explained in more detail in relation to the enclosed drawings, in which.

DETAILED DESCRIPTION

Traditional Data Center (DC) architecture consists of racks of server blades that are networked together. Each server blade is self-contained with resources such as processors, memory, storage, and input/output (I/O) peripherals. Since the resources that make up the server blade are within the physical confinement of a 'box' replacing or augmenting any one of the components in case of failure causes other resources in the server to also be out of use for a period of time. This induces inflexibility in large scale data centers with respect to maintenance and upgrade of resources. Another issue with traditional server blades is the static nature of its compositions, once deployed it cannot be automatically recomposed with different quantities of resources to suit different workloads in a data center.

Figure 1:
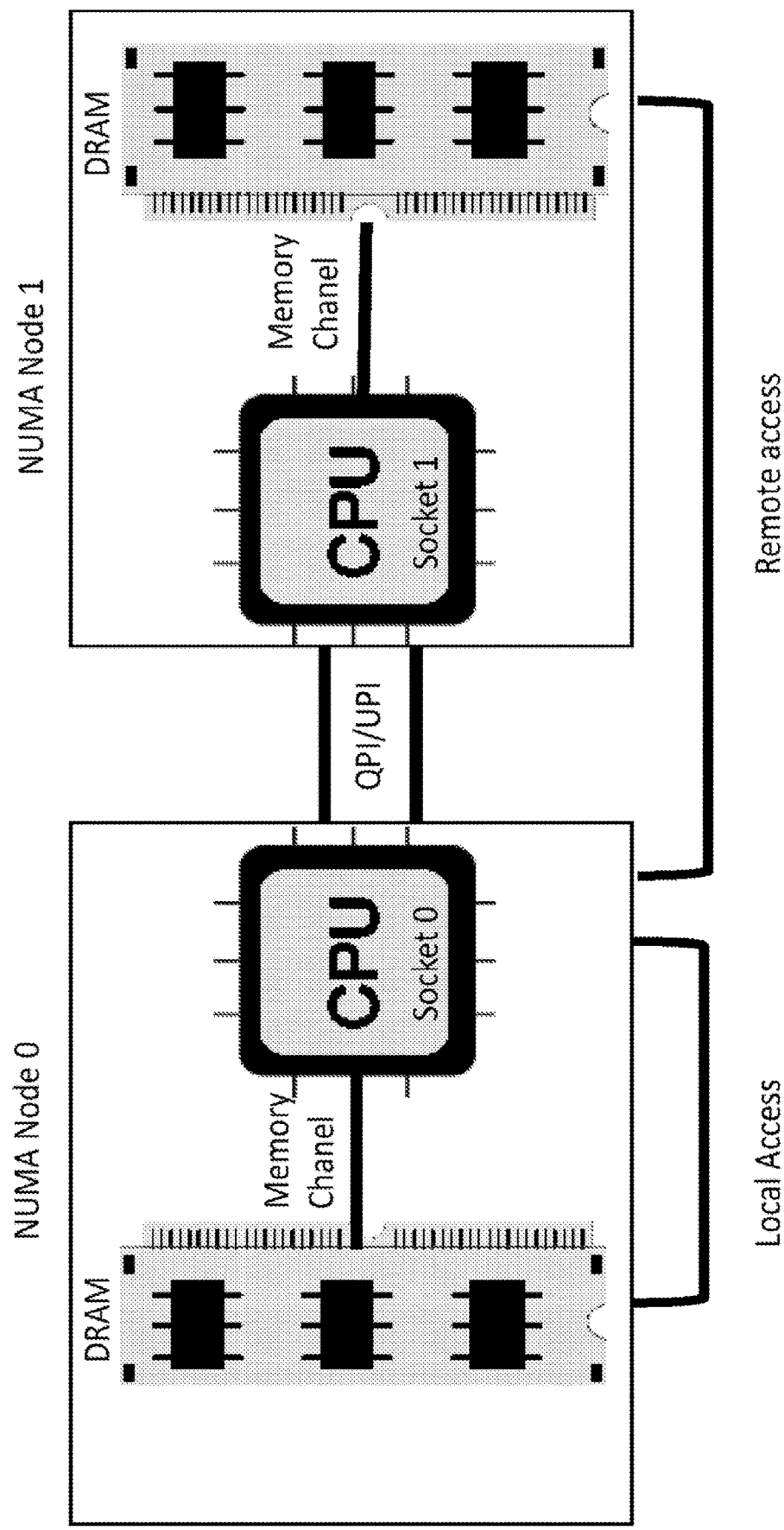
FIG. 1 shows a system with two NUMA nodes—each socket might contain number of CPU cores.
Figure 2:
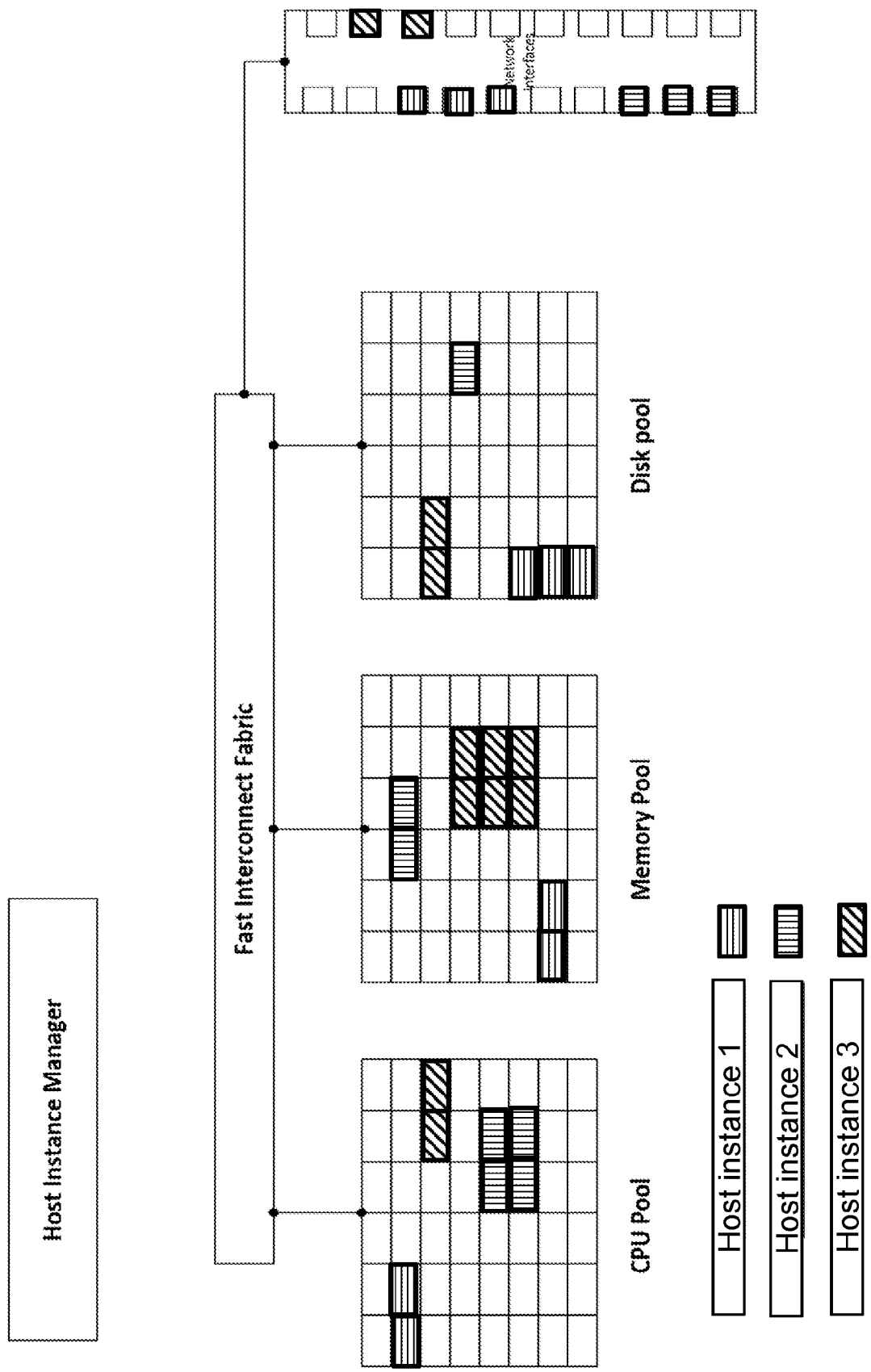
FIG. 2 shows a disaggregated DC showing 3 logical hosts/servers.

Disaggregated data center architecture separates the resources that make up a functional server and places the resources within discrete pools, See FIG. 2. Resources from the pools may then be picked and associated together to build the functional server when needed. The functional server may also be referred to as a logical server. The resource pools are interconnected with one another using fast interconnect fabric e.g. a superfast fabric.

However, with the way disaggregation of hardware resources, driven by the need for e.g. having more flexibility, modularity, increasing the utilization, reducing the cost, and high-performance system, one could easily imagine running independent operating systems in the same CPU or across multiple CPUs on the same board. Since, such a scenario removes hypervisor layer, security problems introduced by the hypervisor layers are removed. There is also the case that, with the advent of silicon optics, a fast inter CPU interconnect, a functional server can spread beyond single CPU board boundary. However, these new systems will be rendered impractical with the existing cache coherence solutions which broadcast to all the connected hardware.

Embodiments herein provide a manner to reduce cache coherency traffic across a functional server comprising a plurality of processor cores either in a single processing unit or across multiple processing units in a disaggregated data center. Thus, the number of cache coherency messages transmitted across different data centers or within the same data center will be reduced. Embodiments herein specify a coordinating entity that configures communicating entities to direct and filter cache coherency messages within the disaggregated data center. Processor cores are grouped across one or more data centers into a single cache coherency domain and the communicating entities may perform messaging of cache coherency messages within one cache coherency domain. A new mechanism is provided to limit and efficiently propagate the cache coherency messages across multiple racks in one or more data centers i.e. the disaggregated data center.

Figure 3:
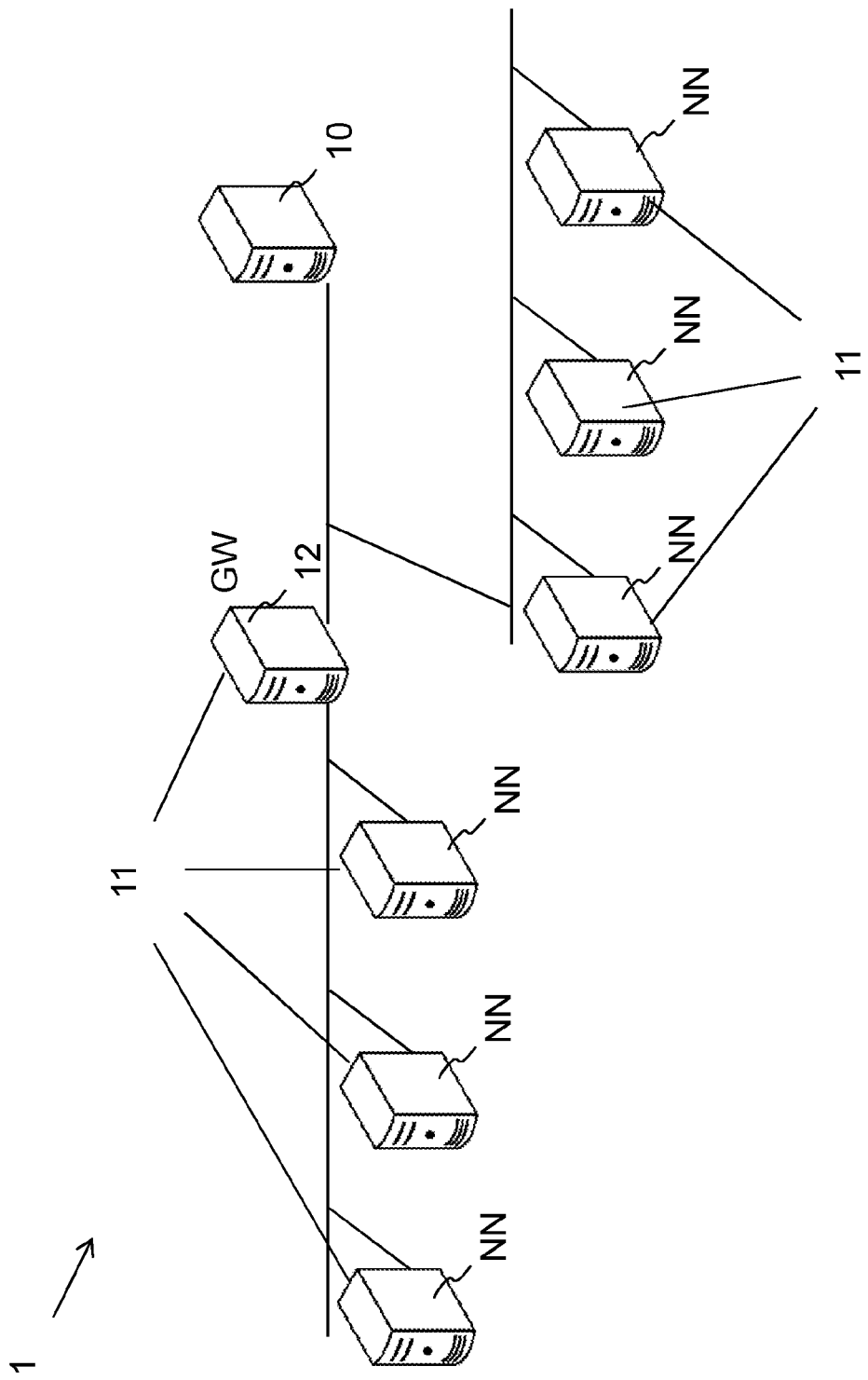
FIG. 3 shows a schematic overview depicting a system according to embodiments herein.

FIG. 3 discloses a communication network 1. The communication network may be a packet switched network comprising a number of network nodes (NN). The communication network may comprise a coordinating entity 10 e.g. a hardware entity, in a disaggregated data center architecture wherein computing resources, e.g. processor cores and/or memories of the NNs, are separated in discrete resource pools and associated together to represent a functional server. The communication network may comprise a number of communicating entities 11 such as one or more gateways (GW) 12 and one or more processor cores of the NNs, e.g. a pool of processor cores.

As discussed earlier, new technologies may introduce much different cache domains. The existing broadcast-based cache coherency domains do not scale very well as they are very limiting in the current generation itself. Embodiments herein minimize the broadcasts and lookups for forwarding the cache coherency messages, e.g. messages of updated cache lines. A mechanism is provided to limit and efficiently propagate the cache coherency messages across a disaggregated data center such as multiple racks in a data center. Embodiments herein limit communication of cache coherency messages and efficiently propagate the cache coherency messages across the disaggregated data center. Embodiments herein may thus use resources in a more efficient manner. Embodiments herein enable a creation of a many-core optimized server with computing resources spread across data centers or a data center which would be useful in solving e.g. data deluge, wherein data deluge refers to the situation where the sheer volume of new data being generated is overwhelming the capacity of institutions to manage it and researchers to make use of it. Furthermore, embodiments herein enable running an optimized hypervisor free, multi-operating system support in a single socket or across multiple sockets.

Figure 4:
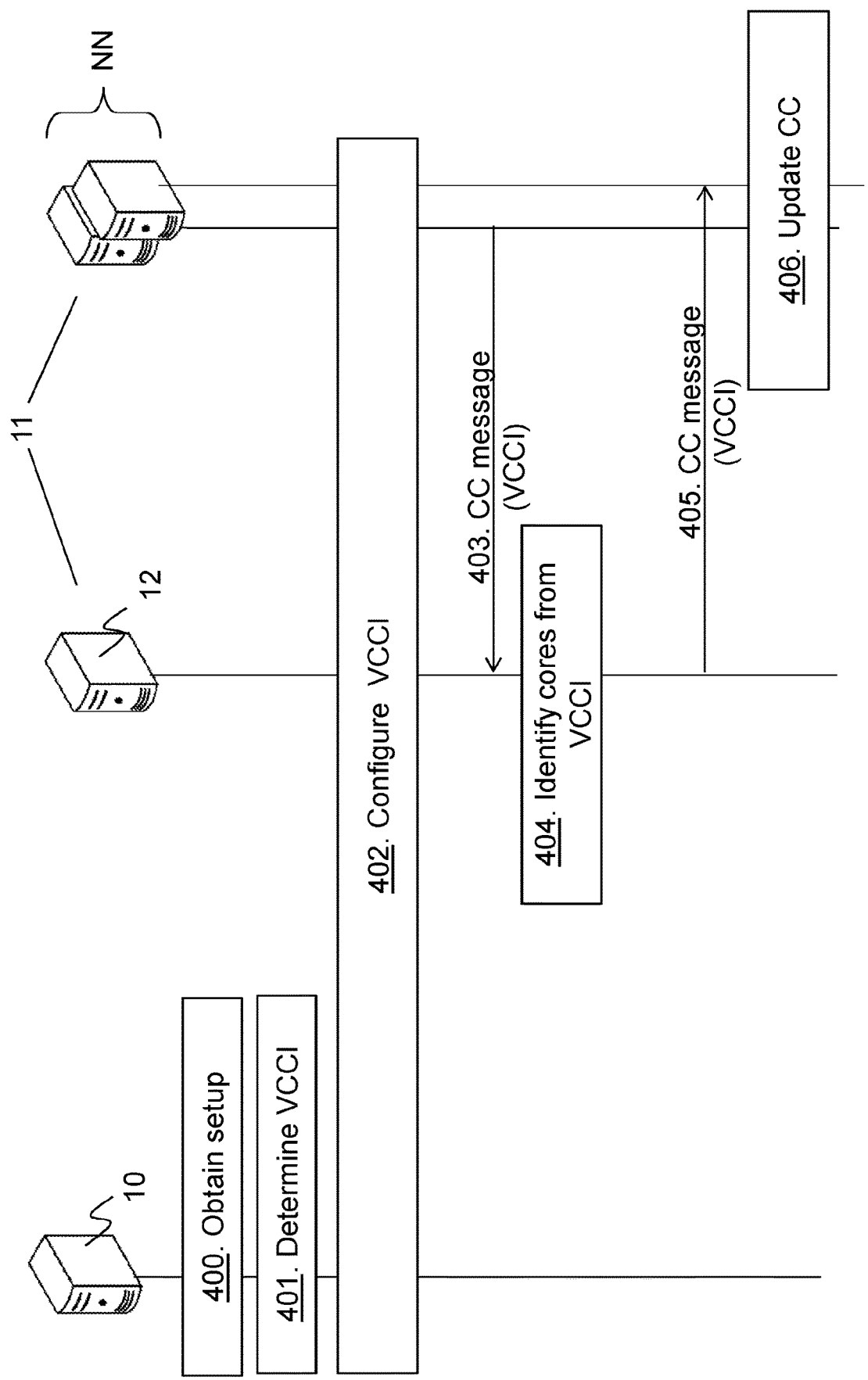
FIG. 4 shows a combined flowchart and signalling scheme according to embodiments herein.

FIG. 4 is a combined flowchart and signalling scheme disclosing embodiments in a disaggregated data center accordingly.

Action 400. The coordinating entity 10 obtains a setup of processor cores that are coupled logically as the functional server. E.g. the coordinating entity may receive or be configured with a list of processor cores used in the functional server and also realize, e.g. discover, what gateways that are involved in the setup of the functional server. E.g. an entity that selects different processor cores to realize the logical server may provide such information indicating the setup. Action 400 may be a part of a configuration for setting up the functional server.

Action 401. The coordinating entity 10 determines an index indicating an identity of a cache coherency domain based on the obtained setup of processor cores. The index may be a virtual cache coherency index (VCCI) comprising one or more parts of information. E.g. a first part that identifies the processor cores that are part of the cache coherency domain across the data center architecture, a second part that identifies participating processor cores of a generating processor socket; and/or a third part that identifies whether a message needs to be sent out of present processor socket. Present herein meaning the processor socket processing the CC message e.g. receiving or generating the CC message. The VCCI is an identifier which is added to cache coherency messages. This identifier identifies the processor cores in the disaggregated DC which should receive this message. Cache coherency messages are generated due to application either reading or writing some part of the memory, and the generating processor socket is a socket on which a processor core generates the cache coherence message.

Action 402. The coordinating entity 10 configures one or more communicating entities 11, e.g. processor cores of the functional server and the gateway 12, associated with the obtained setup of processor cores, to use the determined index when handling updated cache related data. E.g. the coordinating entity 10 may configure a processor core of a network node with a format for cache coherency messages and may also configure the GW 12 on how the GW should deal with cache coherency messages.

Action 403. A processor core may perform a memory update e.g. an updated cache line, and a CC message may be generated with the index, VCCI, added as configured by the coordinating entity 10. The CC message is then transmitted over the CC domain.

Action 404. The communicating entity 11, exemplified herein as the GW 12, may receive the CC message, indicating the updated cache related data e.g. the updated cache lines, comprising the index such as the VCCI. The GW 12 may identify processor cores and/or other GWs based on the index.

Actions 405. The GW 12 may then send the CC message e.g. with same VCCI or another VCCI, to one or more other communicating entities 11 such as processor cores of network nodes NN and other GWs. The GW 12 may e.g. determine index to forward in CC message e.g. based on the index in the received CC message and/or where it is to be transmitted. The GW 12 may handle the CC message by forwarding the CC message to a target entity based on the index in the index part, i.e. to a communicating entity addressed by the index. It should be noted that an intermediate communicating entity such as a switch or router may receive the CC message from a source GW and based on the index in the CC message decide the output towards a destination GW. The CC messages may thus be forwarded within one socket or between a number of sockets of one or more network nodes. This may thus lead to an efficient routing of cache coherency messages in cache coherent domain of a disaggregated data center. A cache coherency domain comprises one or more processor cores of different processing units or sockets. Embodiments herein may further create a loop free cache coherency message propagation.

Action 406. The receiving communicating entity e.g. processor core of network node NN handles the received updated cache related data by e.g. updating its cache, as indicated in the CC message, wherein the index indicates an identity of the processor core of network node NN. The processor core may thus update its cache when receiving a CC message indicating VCCI of the processor core as configured by the coordinating node 10.

Figure 5:
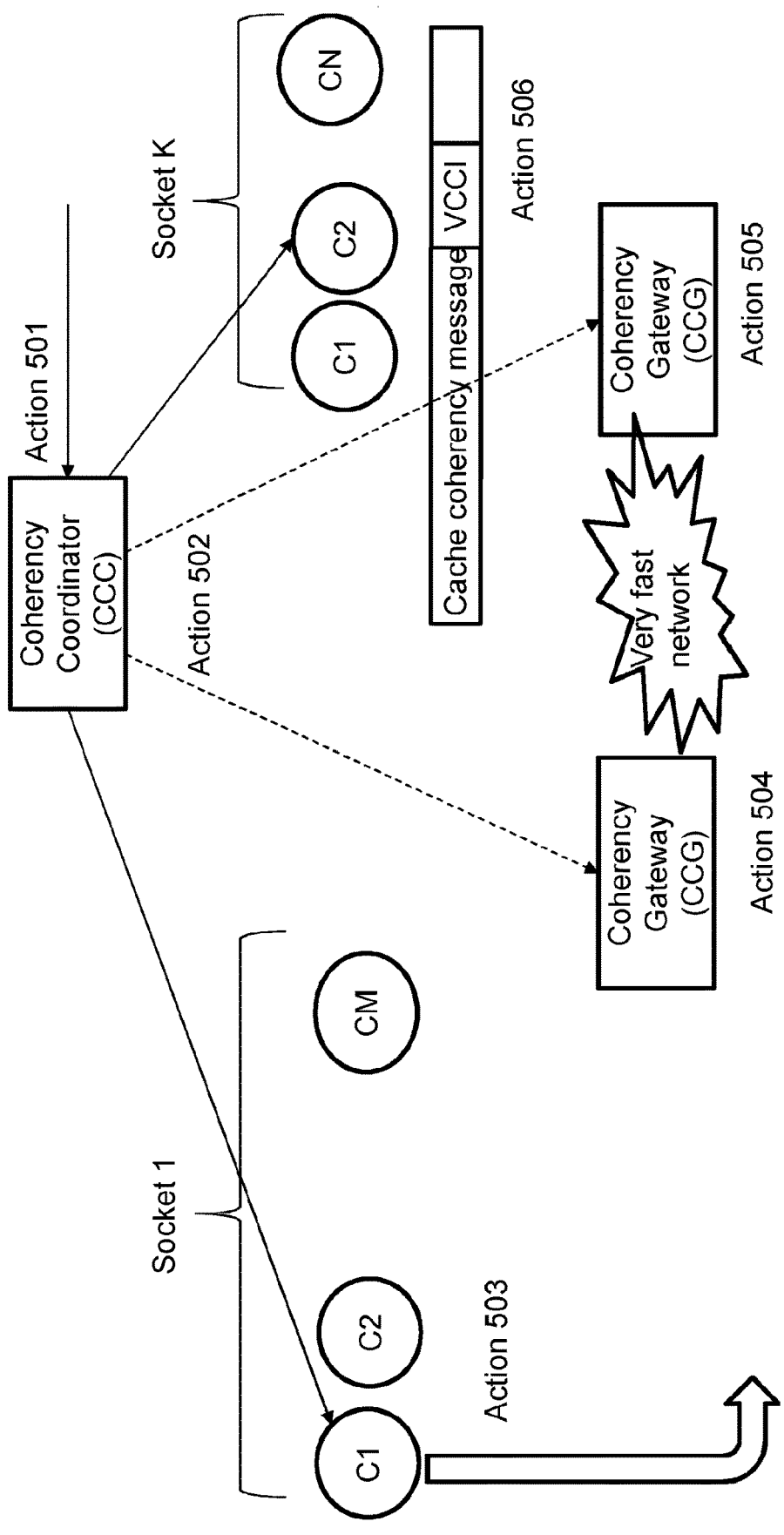
FIG. 5 shows a schematic overview depicting a method according to embodiments herein.

FIG. 5 shows a schematic overview of a cache coherency process according to embodiments herein.

Action 501. The coordinating entity 10 also referred to a Cache Coherency Coordinator (CCC) gets or retrieves the list of processor cores that are coupled logically into the functional server.

Action 502. The CCC decides on the VCCI and configures the processor cores, e.g. C1-CM of processor socket 1 and C1-CN of processor socket 2, to use the VCCI. It also needs to configure the GWs, also referred to as a Cache Coherency gateway (CCG), so that message can be routed to the target entity such as target machine or target processor core. The CCG may look into the index part of the CC message and may forward it accordingly to a correct or destined target. This CCG may have a lookup table that identifies a given set of processor cores that identifies the target processor cores and target outgoing interfaces e.g. a fast interconnect may be configured so an outgoing CC message from the CCG reaches its destination. The CCG may be a part of a processor socket or may be realized as a separate entity, a stand-alone, by itself. When the CCG is part of the processor socket or a CPU, denoted as CCG-C, it is expected to support relatively short tables for VCCI lookups. When a CCG realized as an independent hardware entity, denoted as CCG-H, itself can support many more interfaces. A simplified ternary content-addressable memory (TCAM) like interface may be used to realize such a hardware entity.

Action 503. The processor core such as a first processor core C1 generates, e.g. upon updating a cache line, its CC messages including the VCCI and transmits the message, e.g. the processor core broadcast the CC message.

Action 504. The CCG looks into, examines, index part, also referred to as VCCI part, of the CC message and if required forwards that message to the target entity such as a different GW.

Action 505. Another CCG or the CCG examines into VCCI of the CC message and if required the CCG may pick it and send it to the right set of processor cores.

Action 506. The target core such as the second processor core C2 receives the CC message and acts accordingly, e.g. updates its cache.

The coordinating entity 10 may be thus be the entity that may be part of a management of disaggregated data center. The coordinating entity 10 may be responsible to decide on VCCI and configure the processor cores with the VCCI value. The coordinating entity 10 may further set up the CCG-C on all the processor sockets and/or CCG-Hs to forward the CC messages appropriately.

When a CC message arrives e.g. at the GW 12, the GW 12 may have to identify the set of processor cores that particular CC message needs to be delivered to and the set of interfaces that the CC message should be sent out on. To do so the GW 12 looks up or determines for forwarding cache coherency traffic. To reduce the latency of lookups and reduce the size of tables where the VCCIs are stored, following schemes are proposed.

VCCI identifier itself has been divided into several sub parts
- A first part that identifies the cores that are part of the cache coherency domain across the data center (DC) and/or a processor socket
- A second part that identifies the participating cores in the generating socket
- A third part that identifies whether this message needs to be sent out of this processor socket.

A first scheme takes advantage of the full mesh of interconnection fabric that exists on traditional server racks or on the proposed CPU sleds in a disaggregated server. Where such a fabric mesh does not exist, at most a set number of hops is permitted, e.g. 1 hop, when CC messages are transported through a transit CPU. This is done to avoid complex looping logic and affecting the performance of any transit cache coherence traffic on the CPU. The coordinating entity 10 may take this into account when providing processor cores for the functional server. A rack level or CPU sled level, in the disaggregated data center architecture, the gateway 12 may have more capacity and can distribute the cache coherency messages across blades and racks.

An example scheme is shown below.

64 bits of VCCI can be broken into the following parts

A 64-bit value of 0 determines that the messages need to spread along all its cores and cache coherency interfaces.

| VCCI format | | | |
|---|---|---|---|
| CCI_SCOPE | CCI_INT_IDX | CCI_CORE_IDX | CCI_ID |

In this format
CCI_SCOPE may be a 1-byte value that determines the version and scope of the CC messages e.g. which processor cores are part of the CC message. The first part may be used on the receiving socket to look up a receiving processor core.
CCU_INT_IDX may be a 1-byte value that determines or defines an interface mask through which the CC message should go out on. A socket may have one or more interfaces. This may be used on the generating communicating entity, and may have one or more QPI/UPI sort of links
CCI_CORE_IDX may be a 2-byte value that is the index of an array/table which can be looked in the GW 12 that brings the core mask of the processor cores which are part of this cache coherence domain.
CCI_ID is a 4-byte value unique value across the data centre/subset of a data centre which uniquely is assigned to all the processor cores participating in the cache coherency domain.

It should be noted that the coordinating entity 10 may program the processor cores of a same cache coherency domain with a same CCI_ID but with different VCCI. The other values may remain same in a given processor socket but will vary across different processor sockets.

The CCI_SCOPE may be 8 bits and determine the scope of the message processing
- Bit 0 (Least significant bit)=1 indicates that the CC message has local core membership
- Bit 1=1 indicates that the CC message need to be sent out on external interfaces
- Bit 2=1 indicates that special processing is required for some output interface i.e. if the interface is used for 1-hop processing The second 8 bits may be a bit mask of QPI/UPI interface indexes on the CPU core (CCI_INDEX). This is the bit mask of the external interface this message needs to go out.

The bytes 3-4 may be an index into a core set that is stored in memory. This an index into an array of which provides the set of processor cores that share the same CCI_ID.

The bytes 5-8 includes the CCI_ID that may determine a core membership.

The values discussed above as sizes of different portion of the VCCI is a proposal and may be changed. As an example, the administrator can set the byte assignment in the DC based on the CPU capabilities. For example, the CCI_CORE_IDX can be assigned 12 bits and CCI_INDEX can be assigned 12 bits instead of the 2 bytes and 1 byte assigned above. It is also possible that interface mask itself can be treated as an index and looked up in a table. One can also think of adding extra bytes only for the source CPU lookups, to optimize a common case. This is done not to avoid a 16-byte penalty on a 64-byte cache coherency payload. If the CC message size increases, this could be an optimization.

Figure 6:
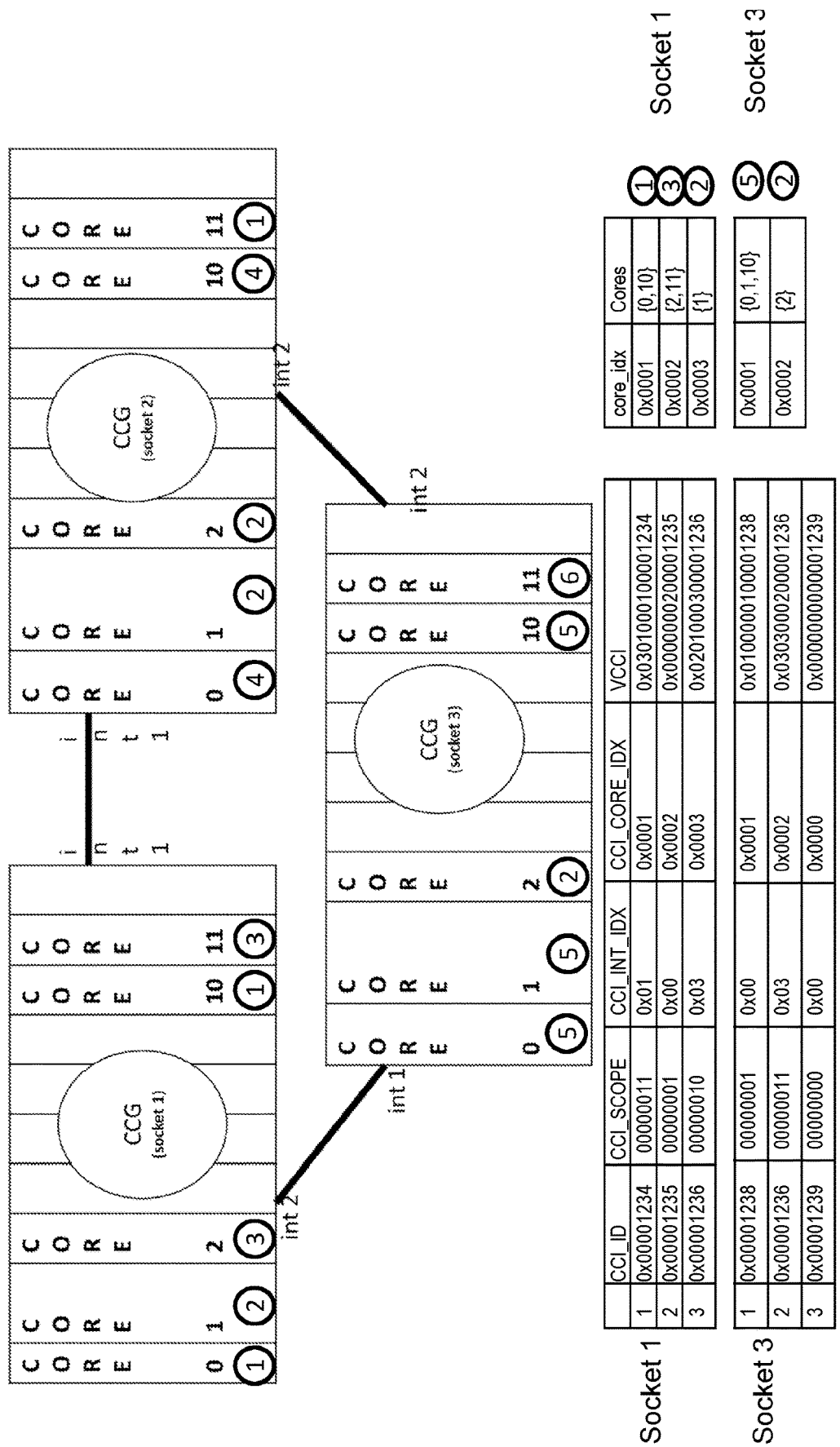
FIGS. 6-8 show different ways of using VCCI according to embodiments herein.
Figure 7:
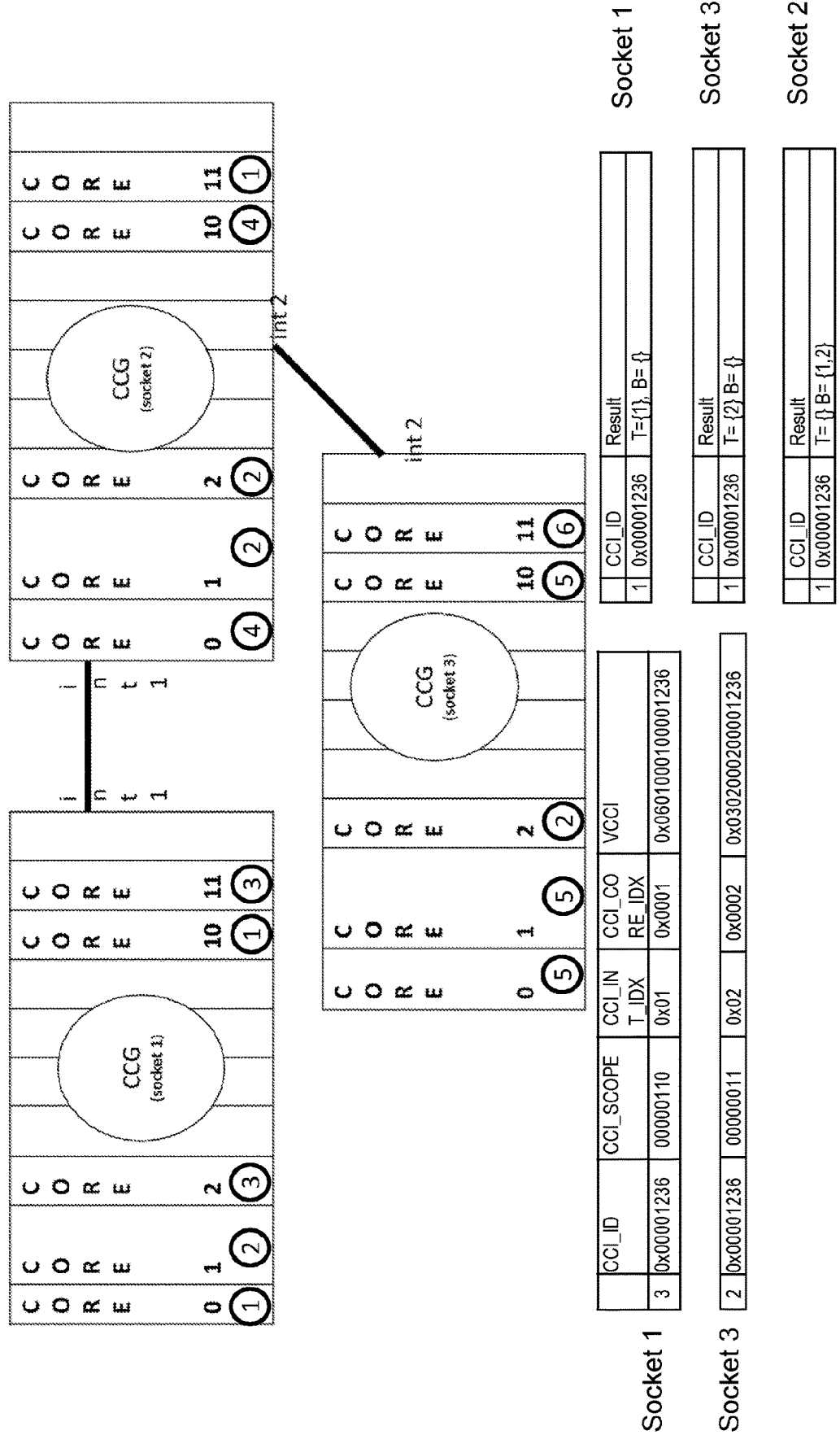
Figure 8:
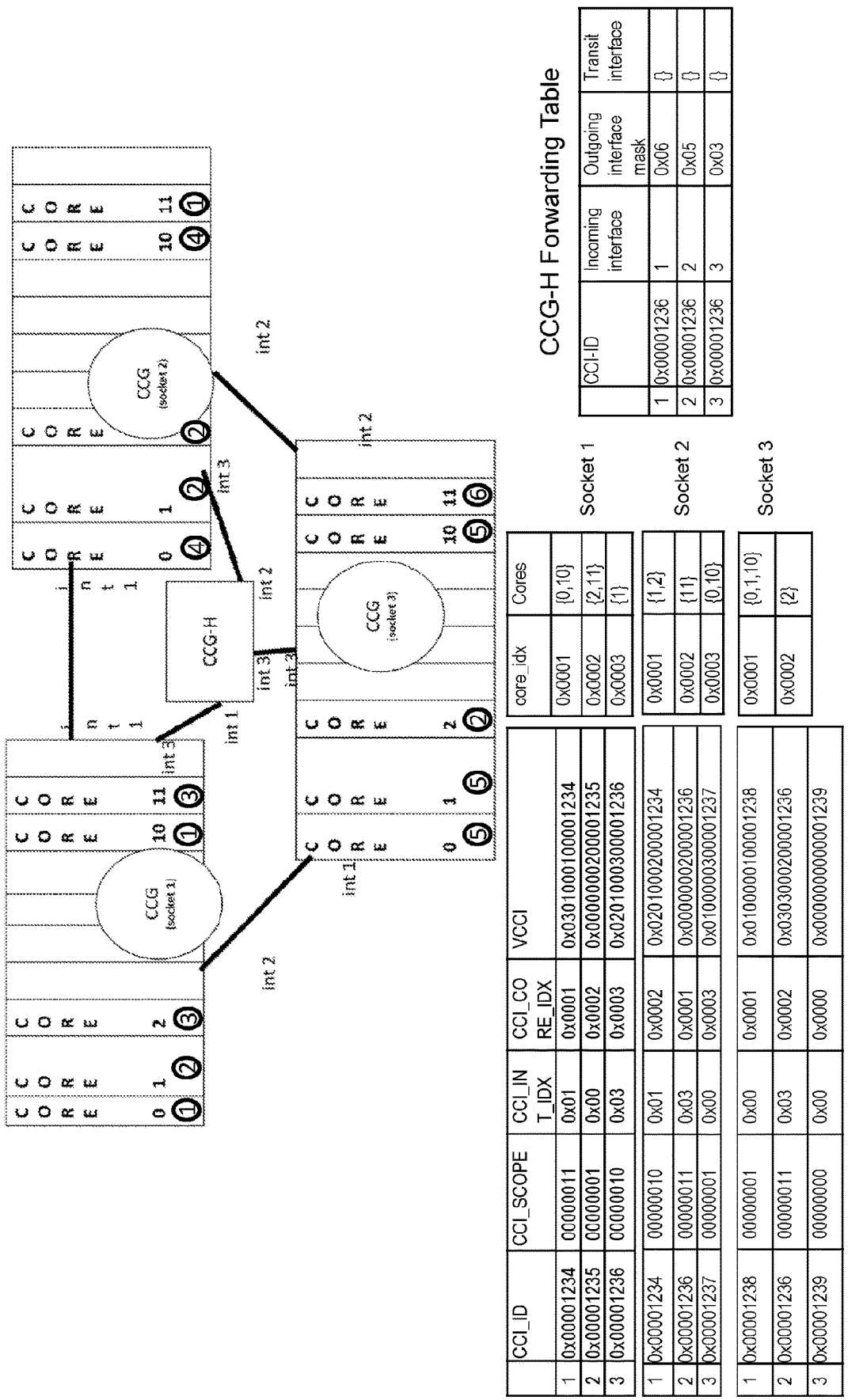

The diagrams in FIGS. 6-8 and tables illustrate the flow of using VCCI. The following figure contains 3 sockets, a first, a second and a third socket. Processor cores in the same circled numbers across these three sockets represent a cache coherence domain. Thus, 6 cache coherency domains are illustrated.

FIG. 6 shows how the tables that are configured in a CCG. The left tables represent CCG's VCCI mapping table (CCG_VCCI_TBL) for each socket. The right tables show CCI_CORE_IDX to core mapping (CORE_IDX_TBL), i.e. index of the cores of each socket. Each row maps a CCI_CORE_IDX to the set of cores and is limited to that socket only. Since each CCI_CORE_IDX is mapped to a VCCI, this represents a single coherency domain on that specific socket.

Coordinating entity 10 programs the full VCCI in each processor core and gateway with the relevant information of messages.

Cache Coherency Message Propagation

When a communicating entity 11 such as a processor core generates a CC message with a VCCI, the CC message does not require a look up in CCG_VCCI_TBL on the generating CPU socket, i.e. the socket comprising the processor core generating the CC message.

- The CCG looks at the least significant bit (LSB) of CCI_SCOPE (FIGS. 6-8, CCI_SCOPE column) from the VCCI of the message. A value 0 indicates that no other processor cores from that domain are present on the socket and the next step is skipped.
  - If the value of this bit is 1, the CCI_CORE_IDX is extracted from the VCCI by the CCG. The extracted value from the message is looked up in the CORE_IDX_TBL. This results in the set of cores that are participating in that cache domain on that socket. The CCG removes the originating core and sends the message to the rest of cores from the set.
- The CCG Looks at the second bit (next to LSB) of CCI_SCOPE. If the bit is unset, no need to send the message out.
  - If the bit is set, the message is sent to the interfaces specified in the CCI_INT_IDX field of VCCI, which is a bitmask of the interfaces through which this message needs to be sent out.

Cache Coherency Message Reception

There are e.g. two types of communicating entities that can receive the CC messages.

- A destination processor core: The message is processed as before. No change is necessary.
- The gateway 12 such as a CCG receives the message from an interface.
  - a. The CCI_ID is extracted from the VCCI table and looked up in the CCG_VCCI_TBL. The output contains the CCI_CORE_IDX.
  - b. The CCI_CORE_IDX is looked up in the CORE_IDXTBL. The lookup returns the set of processor cores that are a part of the cache coherency domain, and the message is forwarded to those processor cores
  - c. The CCU_INT_IDX bit mask is extracted from VCCI. Messages are sent to all the interfaces that are a part of the bit mask.

Example

Following is an example of processing chain of a cache coherency message in the proposed system

- When core0 on socket 1 is generating a cache coherency message, it adds the VCCI (0x0301000100001234) as provisioned by the CCC to the cache message.
- CCG upon receiving the message from the core extract the CCI_SCOPE attribute with the result 00000011
- The LSB (least significant bit) being set to 1 causes the following actions
  - The CCI_CORE_IDX(0x0001) is extracted from the VCCI id.
  - The CCI_CORE_IDX is looked up in the table CORE_IDX_TBL which generates result {0,10}
  - The incoming core number (0) is removed from the result generating the set {10}
  - The message is transmitted to core 10 which does the normal processing on receipt
- The second bit (next to LSB) is checked. Since it is set 1
  - The CCI_INT_IDX (0x01), the outgoing interface mask is extracted from VCCI field
  - The message is sent to the interfaces {1} specified in the mask which happens to be only 1 interface
- No further processing is done for this message on socket 1
- On receiving this message on socket 2 via its interface 1, the following process is performed by the CCG on socket 2
- The CCI_ID(0x00001234) field is extracted from VCCI.
- CCI_ID is looked up in CORE_IDX_TBL (FIG. 6, Table to the right) outputting the cores participating in this domain, in this case only one core {11}.
- Message is forwarded to core 11 which does the normal processing and stores the cache update Special Case It is possible that in some cases full mesh direct connectivity is not available. The scheme enables the forwarding of the messages through a directly connected adjacent CPU socket.

The difference between FIG. 7 and FIG. 6 is the missing connectivity between socket 3 and socket 1. The only cache coherency domain that is affected by this is the CC domain denoted as 2. This affects the cache coherency messages generated by core 1 on socket 1 and core 2 on Socket 3. The entries on socket 2 remain unchanged.

CCC provisions a new connectivity table to socket 1,2,3 called CCI_INT_CON. The table is indexed by the CCI_ID and the result contains 2 sets of interfaces Transit, Bypass shown respectively as T,B in the table. The changed entries are shown in FIG. 7.

The Transit set represents the set of interfaces where transit messages needs to be sent. The Bypass set is used by the transit CPU, i.e., socket 2 in the above example, to figure out which interfaces a transit message need to be replicated to.

Message Generation/Propagation

When Core 1 on socket 1 is generating a cache coherency message the following sequence of steps happens.

- it just fills the VCCI as configured by the coordinating entity 10. No special processing needed here.
- The CCG performs processing steps as specified above.
- The presence of the $3^{rd}$ bit being set in the CCI_SCOPE in the VCCI causes the following changes
  - The CCI_ID is used to lookup in table CCI_INT_CON. The result contains the interface 1. A duplicate message is created with setting just the $3^{rd}$ bit in the CSI_SCOPE and clearing out all the other fields except the CCI_ID field.
- Socket 2 receives this message from its interface. It notices the $3^{rd}$ bit being set to 1, and it will look up in the CCI_INT_CON table. The result returns the set {1,2}. It ignores the incoming interface, i.e., interface 1, and transmits it out from interface 2.
- Socket 3 when it receives the messages from the interface, it does the processing as specified above. No special processing is required.

CCG-H

The gateway 12 denoted as CCG-H is a hardware-based entity that can efficiently process and replicate messages minimizing replication logic from CPU. The previous sections focused on CCG-C based processing. CCG-H has no local message generation. It can be used to interconnect across racks. CCG-H typically have many more interfaces, as shown in FIG. 8, than a traditional CPU and can be used to interconnect many CPUs. While CCG-Cs are mainly used for locally generated or for message destination-based processing, CCG-H mainly used for transit processing, i.e., messages going from one CPU to another. When a path to CCG-H is available to CPUs, CCC attempts to send the messages to CCG-H rather than transmitting from CPU, see FIG. 8.

FIG. 8 shows CCG-H interconnections with CCG-C. It should be noted that only the CPU cache coherence domain traffic is going through CCG-H in this example. This is due to the fact that in all the other cache coherence domain traffic in our example has been limited to between two directly connected CPUs.

In the two CPU directly connected case, cache domain being between two directly connected CPUs, the CPU has to send only one outgoing message, that it can directly send to the outgoing CPU if the CPU is directly connected. CCG-H can also help in reducing the number of CPU-CPU connections.

The domain traffic may be spread across multiple CPUs and the replication may be optimized in each of the CPUs to be sent to the CCG-H. Error! Reference source not found. In the table to the right, the interface mask has been changed to 0x06 (representing outgoing interface 3) from 0x11 (representing outgoing interfaces 1,2) corresponding to the same lineError! Reference source not found. in FIG. 7 table to the right and thus reducing the replication burden from the CCGs in all the CPUs.

CCG-H looks up in the CCG_FWD_TBL using the incoming interface id and CCI_ID extracted from the message. For example, for the messages coming from socket 1, the lookup key is the combination of CCI_ID 0x00001236 and interface 1. The result is the outgoing interface mask, in this case 0x06 (representing outgoing interfaces 2 and 3). Transit messaging that needs to be injected in a CPU can be performed by the CCG-H using a single incoming message as opposed to two messages being generated by the generating CPUs in the previous case.

Figure 9:
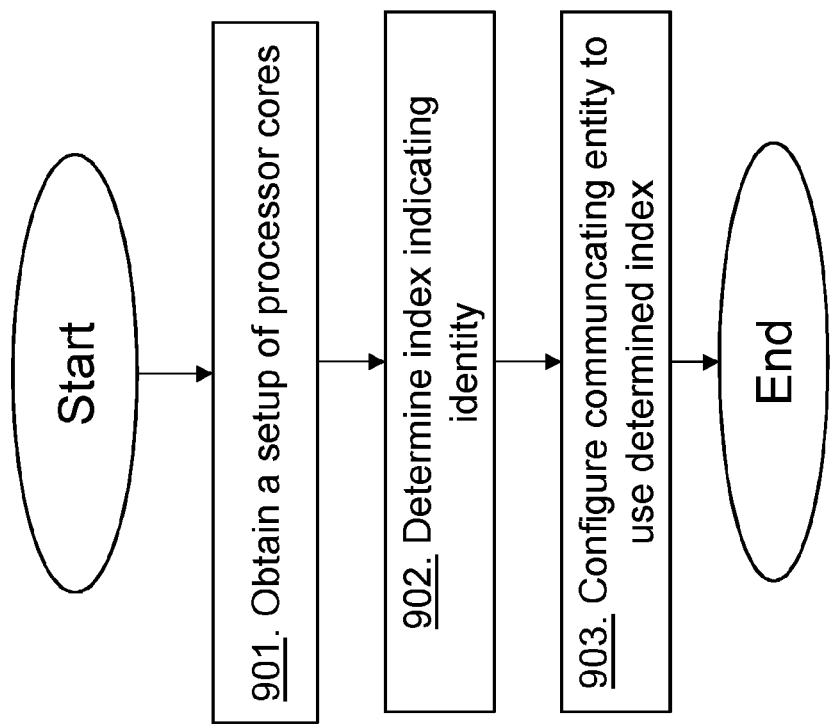
FIG. 9 is a schematic flowchart depicting a method performed by a coordinating entity according to embodiments herein.

Embodiments herein provide entities and/or methods to reduce broadcast of cache coherency traffic to only relevant processor cores both in the processor socket as well as across processor sockets. The method actions performed by the coordinating entity 10 in the disaggregated data center architecture wherein computing resources are separated in discrete resource pools and associated together to represent a functional server according to embodiments will now be described with reference to a flowchart depicted in FIG. 9. The actions do not have to be taken in the order stated below, but may be taken in any suitable order.

Action 901. The coordinating entity 10 obtains the setup of processor cores that are coupled logically as the functional server. This is exemplified in action 400 in FIG. 4.

Action 902. The coordinating entity 10 determines the index indicating the identity of the cache coherency domain based on the obtained setup of processor cores. The index may be a VCCI comprising a first part that identifies the processor cores that are part of the cache coherency domain across the data center architecture, a second part that identifies participating processor cores of a generating processor socket; and/or a third part that identifies whether a message needs to be sent out of present processor socket.

Action 903. The coordinating entity 10 configures one or more communicating entities 11 associated with the obtained setup of processor cores, to use the determined index when handling updated cache related data.

Figure 10:
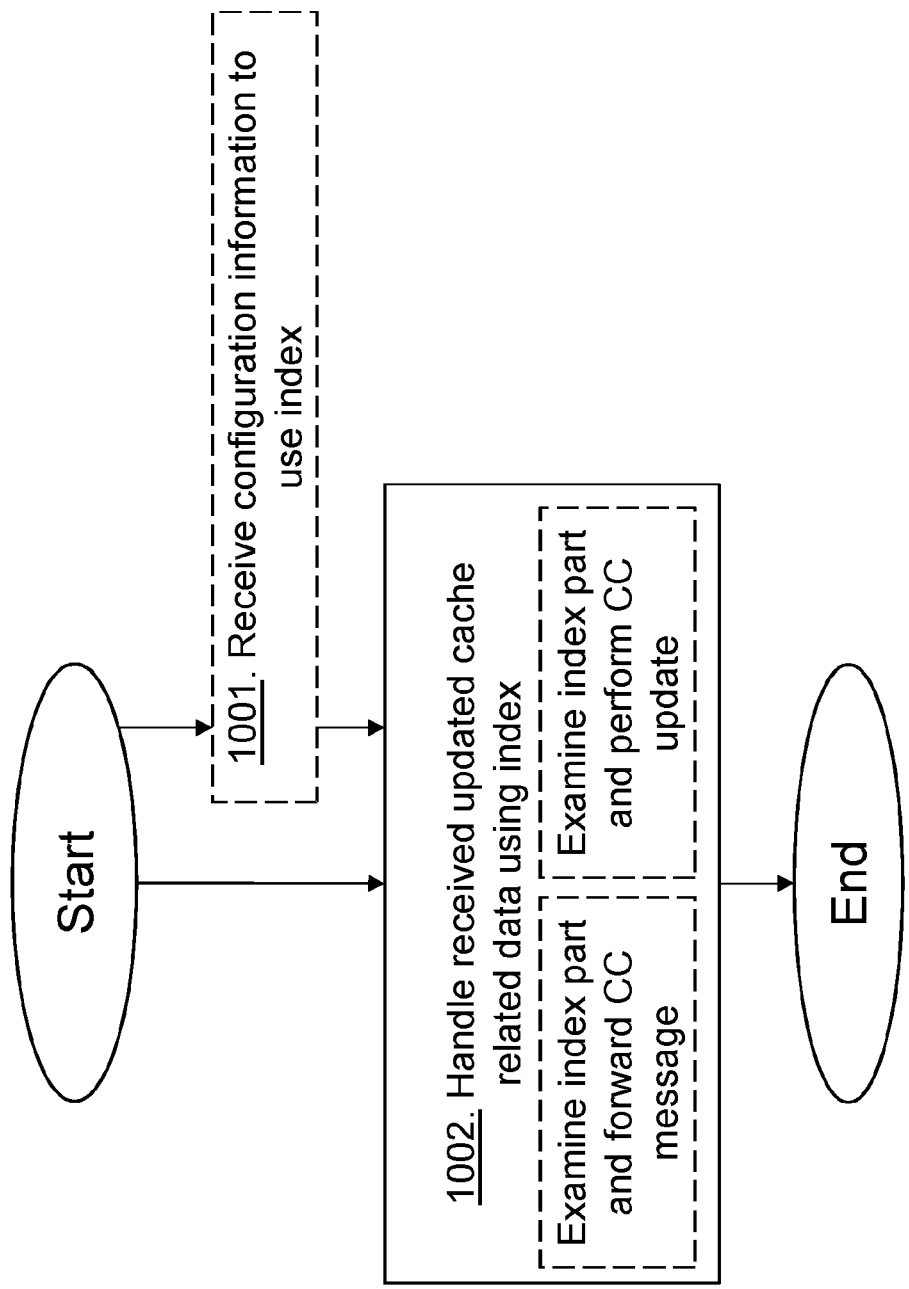
FIG. 10 is a schematic flowchart depicting a method performed by a communicating entity according to embodiments herein.

The method actions performed by the communicating entity 11 in the disaggregated data center architecture wherein computing resources are separated in discrete resource pools and associated together to represent the functional server according to embodiments will now be described with reference to a flowchart depicted in FIG. 10. Actions performed in some embodiments are marked with dashed boxes.

Action 1001. The communicating entity 11 may receive configuring information from the coordinating entity 10 to use the index when handling the updated cache related data. The index may be a VCCI comprising a first part that identifies the processor cores that are part of the cache coherency domain across the data center architecture, a second part that identifies participating processor cores of a generating processor socket; and/or a third part that identifies whether a message needs to be sent out of present processor socket.

Action 1002. The communicating entity 11 handles received updated cache related data using the index; wherein the index indicates the identity of the cache coherency domain. The updated cache related data may comprise a received cache coherency message, and the communicating entity 11 may handle the updated cache related data by examining an index part of the received cache coherency message and by forwarding the cache coherency message to a target entity based on the index in the index part. The target entity may be identified from a lookup table in the communicating entity 11, such as a GW 12, wherein the lookup table identifies a given set of processor cores that identifies one or more target processor cores and one or more target outgoing interfaces. Alternatively, the updated cache related data may comprise the received cache coherency message, and the communicating entity 11 may handle the updated cache related data by examining the index part of the received cache coherency message and by performing a cache coherency update based on the received cache coherency message.

Figure 11:
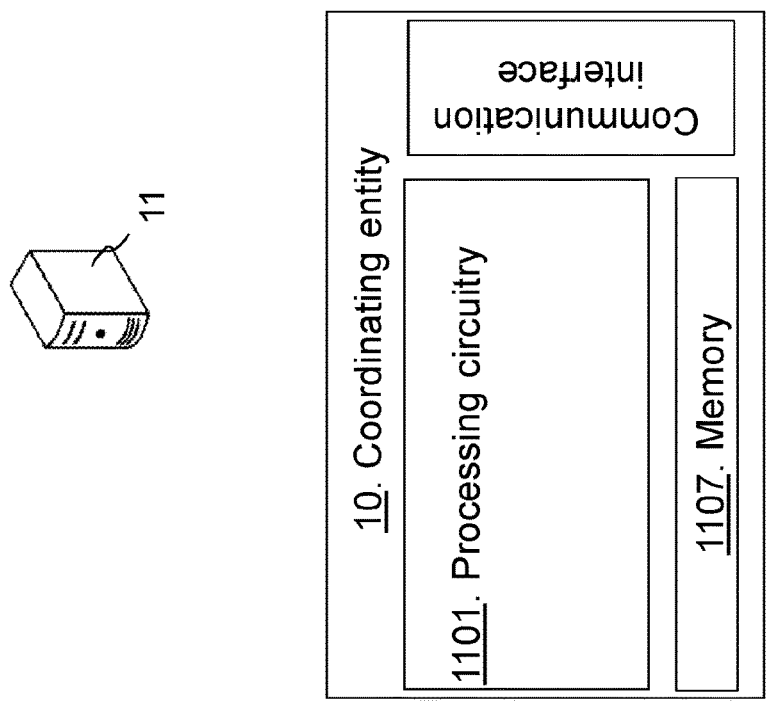
FIG. 11 is a block diagram depicting a coordinating entity according to embodiments herein.
Figure 11:
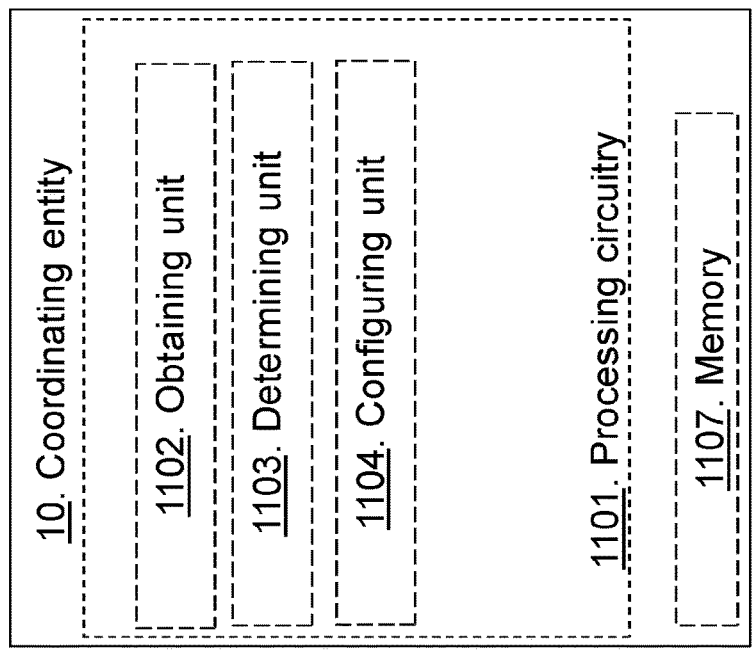
Figure 11:
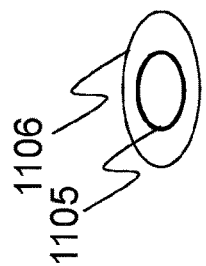

FIG. 11 is a block diagram depicting the coordinating entity 10 in two embodiments configured to operate in the disaggregated data center architecture, wherein computing resources are separated in discrete resource pools and associated together to represent a functional server. The coordinating entity 10 may be for coordinating operations in the disaggregated data center architecture, e.g. providing configuration to the communicating entities 11 how to handle CC messages. This may be running somewhere in a cloud and the coordinating entity 10 may comprise processing circuitry 1101 e.g. one or more processors, configured to perform the methods herein.

The coordinating entity 10 may comprise an obtaining unit 1102, e.g. a receiver, or retrieving module. The coordinating entity 10, the processing circuitry 1101, and/or the obtaining unit 1102 is configured to obtain the setup of processor cores that are coupled logically as the functional server.

The coordinating entity 10 may comprise a determining unit 1103, e.g. a selecting module. The coordinating entity 10, the processing circuitry 1101, and/or the determining unit 1103 is configured to determine the index indicating the identity of the cache coherency domain based on the obtained setup of processor cores.

The index may be a VCCI comprising a first part that identifies the processor cores that are part of the cache coherency domain across the data center architecture, a second part that identifies participating processor cores of a generating processor socket; and/or a third part that identifies whether a message needs to be sent out of present processor socket.

The coordinating entity 10 may comprise a configuring unit 1104, e.g. a transmitter module. The coordinating entity 10, the processing circuitry 1101, and/or the configuring unit 1104 is configured to configure the one or more communicating entities 11 associated with the obtained setup of processor cores, to use the determined index when handling updated cache related data.

The coordinating entity 10 further comprises a memory 1107. The memory comprises one or more units to be used to store data on, such as setup of functional server, IDs, indices, configuration, applications to perform the methods disclosed herein when being executed, and similar.

The methods according to the embodiments described herein for the coordinating entity 10 are respectively implemented by means of e.g. a computer program product 1105 or a computer program, comprising instructions, i.e., software code portions, which, when executed on at least one processor, cause the at least one processor to carry out the actions described herein, as performed by the coordinating entity 10. The computer program 1105 may be stored on a computer-readable storage medium 1106, e.g. a universal serial bus (USB) stick, a disc or similar. The computer-readable storage medium 1106, having stored thereon the computer program product, may comprise the instructions which, when executed on at least one processor, cause the at least one processor to carry out the actions described herein, as performed by the coordinating entity 10. In some embodiments, the computer-readable storage medium 1106 may be a non-transitory or a transitory computer-readable storage medium. The coordinating entity 10 may comprise a communication interface comprising a transceiver, a receiver, a transmitter, and/or similar.

Figure 12:
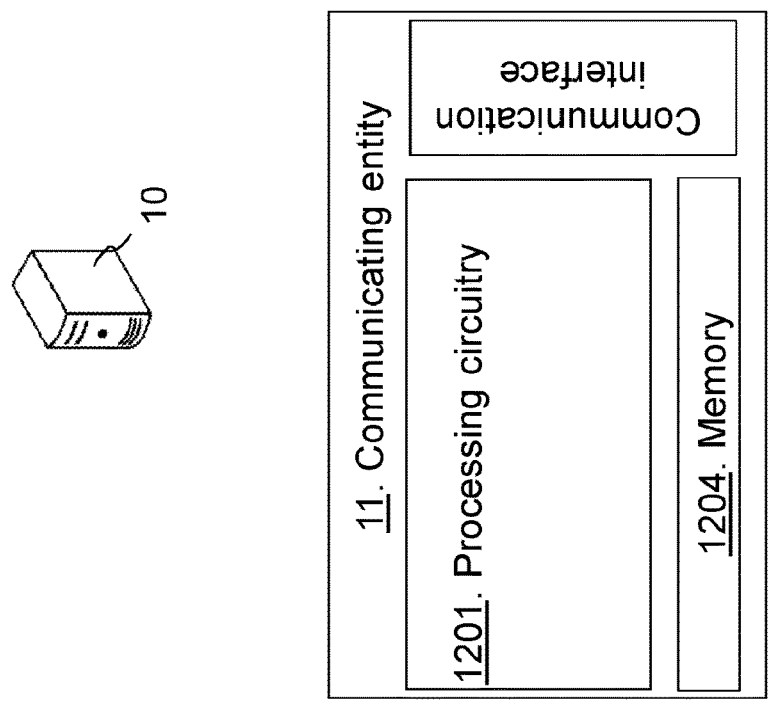
FIG. 12 is a block diagram depicting a communicating entity according to embodiments herein.
Figure 12:
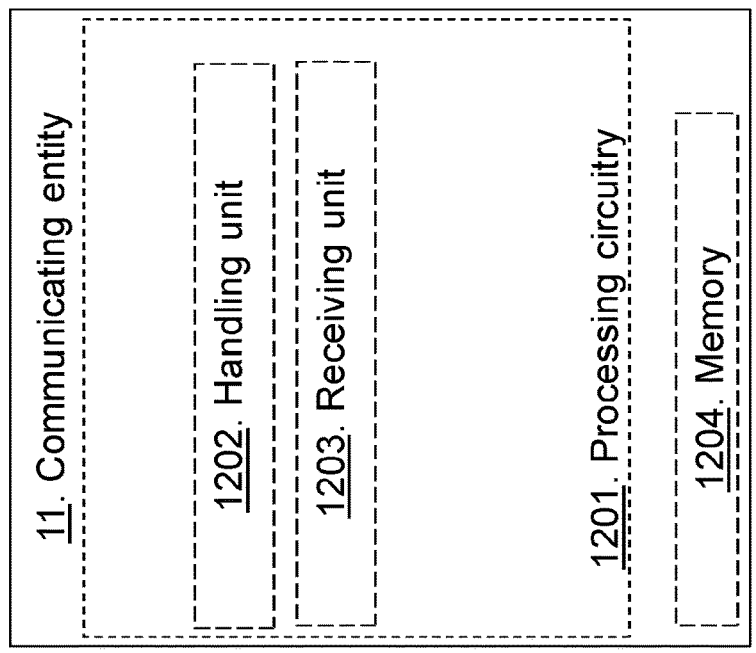
Figure 12:
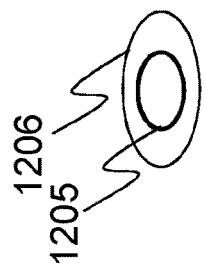

FIG. 12 is a block diagram depicting the communicating entity 11 in two embodiments configured to operate in the disaggregated data center architecture, wherein computing resources are separated in discrete resource pools and associated together to represent the functional server. The communicating entity 11, e.g. processor cores, gateways or similar, may be for communicating in the disaggregated data center architecture. This may be running somewhere in a cloud and the communicating entity 11 may comprise processing circuitry 1201 e.g. one or more processors, configured to perform the methods herein.

The communicating entity 11 may comprise a receiving unit 1203, e.g. a receiver, transceiver or retrieving module. The communicating entity 11, the processing circuitry 1201, and/or the receiving unit 1203 may be configured to receive configuring information from the coordinating entity 10 to use the index when handling the updated cache related data.

The communicating entity 11 may comprise a handling unit 1202, e.g. a processor, transmitter, cache handling unit or similar. The communicating entity 11, the processing circuitry 1201, and/or the handling unit 1202 is configured to handle the received updated cache related data using the index; wherein the index indicates an identity of the cache coherency domain.

The updated cache related data may comprise a received cache coherency message, and wherein the communicating entity 11, the processing circuitry 1201, and/or the handling unit 1202 may be configured to handle the updated cache related data by examining the index part of the received cache coherency message and by forwarding the cache coherency message to a target entity based on the index in the index part. The target entity may be identified from a lookup table in the communicating entity 11, wherein the lookup table identifies a given set of processor cores that identifies one or more target processor cores and one or more target outgoing interfaces. When a fast interconnect is configured the outgoing CC message from the GW may reach its destination.

The updated cache related data may comprise a received cache coherency message, and wherein the communicating entity 11, the processing circuitry 1201, and/or the handling unit 1202 may be configured to handle the updated cache related data by examining the index part of the received cache coherency message and by performing the cache coherency update based on the received cache coherency message.

The index may be a VCCI comprising a first part that identifies the processor cores that are part of the cache coherency domain across the data center architecture, a second part that identifies participating processor cores of a generating processor socket; and/or a third part that identifies whether a message needs to be sent out of present processor socket.

The communicating entity 11 further comprises a memory 1204. The memory comprises one or more units to be used to store data on, such as IDs, indices, configuration, applications to perform the methods disclosed herein when being executed, and similar.

The methods according to the embodiments described herein for the communicating entity 10 are respectively implemented by means of e.g. a computer program product 1205 or a computer program, comprising instructions, i.e., software code portions, which, when executed on at least one processor, cause the at least one processor to carry out the actions described herein, as performed by the communicating entity 11. The computer program 1205 may be stored on a computer-readable storage medium 1206, e.g. a universal serial bus (USB) stick, a disc or similar. The computer-readable storage medium 1206, having stored thereon the computer program product, may comprise the instructions which, when executed on at least one processor, cause the at least one processor to carry out the actions described herein, as performed by the communicating entity 11. In some embodiments, the computer-readable storage medium 1206 may be a non-transitory or a transitory computer-readable storage medium. The communicating entity 11 may comprise a communication interface comprising a transceiver, a receiver, a transmitter, and/or similar.

As will be readily understood by those familiar with communications design, that functions means, units, or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of an intermediate network node, for example.

Alternatively, several of the functional elements of the processing circuitry discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of entities will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a communicating entity in a disaggregated data center architecture, wherein computing resources are separated in discrete resource pools and associated together to represent a functional server, the method comprising:
handling received updated cache related data using an index, wherein the index indicates an identity of a cache coherency domain, in which the index comprises a first part that identifies processor cores that are part of the cache coherency domain across the disaggregated data center architecture, a second part that identifies participating processor cores of a generating processor socket, and a third part that identifies whether a message needs to be sent out of present processor socket.

2. The method according to claim 1, further comprising receiving configuring information from a coordinating entity to use the index when handling the updated cache related data.

3. The method according to claim 1, wherein the updated cache related data comprises a received cache coherency message, and wherein handling the updated cache related data comprises examining an index part of the received cache coherency message and forwarding the cache coherency message to a target entity based on the index in the index part.

4. The method according to claim 3, wherein the target entity is identified from a lookup table in the communicating entity, wherein the lookup table identifies a given set of processor cores that identifies one or more target processor cores and one or more target outgoing interfaces.

5. The method according to claim 1, wherein the updated cache related data comprises a received cache coherency message, and wherein handling the updated cache related data comprises examining an index part of the received cache coherency message and performing a cache coherency update based on the received cache coherency message.

6. The method according to claim 1, wherein the index is a virtual cache coherency index (VCCI).

7. A communicating entity in a disaggregated data center architecture, wherein computing resources are separated in discrete resource pools and associated together to represent a functional server, wherein the communicating entity comprising:
at least one processor, and
a memory comprising instructions which, when executed by the at least one processor, cause the communicating entity to:
handle received updated cache related data using an index, wherein the index indicates an identity of a cache coherency domain, in which the index comprises a first part that identifies processor cores that are part of the cache coherency domain across the disaggregated data center architecture, a second part that identifies participating processor cores of a generating processor socket, and a third part that identifies whether a message needs to be sent out of present processor socket.

8. The communicating entity according to claim 7, wherein the communicating entity is further to receive configuring information from a coordinating entity to use the index when handling the updated cache related data.

9. The communicating entity according to claim 7, wherein the updated cache related data comprises a received cache coherency message, and wherein the communicating entity is to handle the updated cache related data by examining an index part of the received cache coherency message and by forwarding the cache coherency message to a target entity based on the index in the index part.

10. The communicating entity according to claim 9, wherein the target entity is identified from a lookup table in the communicating entity, wherein the lookup table identifies a given set of processor cores that identifies one or more target processor cores and one or more target outgoing interfaces.

11. The communicating entity according to claim 7, wherein the updated cache related data comprises a received cache coherency message, and wherein the communicating entity is to handle the updated cache related data by examining an index part of the received cache coherency message and by performing a cache coherency update based on the received cache coherency message.

12. The communicating entity according to claim 7, wherein the index is a virtual cache coherency index (VCCI).

* * * * *